United States Patent [19]

Krablin

[11] 4,212,319

[45] Jul. 15, 1980

[54] ANTI-BACKFLOW DEVICE FOR SILLCOCKS

[76] Inventor: James B. Krablin, 1904 W. 30th St. South, Wichita, Kans. 67217

[21] Appl. No.: 886,735

[22] Filed: Mar. 15, 1978

[51] Int. Cl.² ............................................. F16K 15/18
[52] U.S. Cl. .............................. 137/614.2; 137/516.15
[58] Field of Search ........... 137/614.2, 614.21, 516.11, 137/516.15, 516.17, 516.23, 543.15

[56] References Cited

U.S. PATENT DOCUMENTS

| | | | |
|---|---|---|---|
| 700,569 | 5/1902 | Serrel | 137/614.21 |
| 946,684 | 1/1910 | Neighbors | 137/543.15 |
| 1,003,819 | 9/1911 | Staples | 137/543.15 |
| 1,024,642 | 4/1912 | Marlatt | 137/543.15 |
| 1,129,072 | 2/1915 | Conn | 137/543.15 |
| 1,298,935 | 4/1919 | Hanman | 137/516.23 |
| 1,850,063 | 3/1932 | Pepper | 137/614.2 |
| 2,804,086 | 8/1957 | Johnston | 137/543.15 |
| 3,078,875 | 2/1963 | Farrell et al. | 137/543.15 |
| 3,485,371 | 12/1969 | Costantini | 137/614.2 |
| 4,158,366 | 6/1979 | Van Meter | 137/312 |

*Primary Examiner*—Martin P. Schwadron
*Assistant Examiner*—A. Michael Chambers
*Attorney, Agent, or Firm*—John H. Widdowson

[57] ABSTRACT

An anti-backflow device for preventing fluids from flowing back into a water supply system. The device adapted for attaching to a connecting rod inside a sillcock tube of a standard antifreeze sillcock. The device held in an open position for allowing water to flow through the sillcock under normal operating conditions. The device automatically stopping the backflow of water in the sillcock should there be a loss of water pressure to the sillcock and preventing fluids such as insecticides, chemicals, or the like mixed with water from polluting the water system.

1 Claim, 4 Drawing Figures

ANTI-BACKFLOW DEVICE FOR SILLCOCKS

BACKGROUND OF THE INVENTION

The subject invention relates generally to a device for preventing the backflow of fluids in a water valve, and more particularly, but not by way of limitation, to an anti-backflow device adapted to be mounted on a connecting rod inside a sillcock tube of a standard antifreeze sillcock.

Heretofore, there have been various types of shut-off valves, sillcocks, and antifreeze sillcock valves used for controlling the flow of fluids in a plumbing system. None of the prior art fluid valves are adapted for attaching to a standard antifreeze sillcock to prevent the backflow of fluids therein.

Recently, because of the increase water pollution in this country, the United States Government has become extremely concerned with preventing pollution of water systems used in the connection of spraying of insecticides, chemicals and other liquids used for spraying crops, gardens, weeds, and the like. The pollution of the water systems often occurs due to the backflow of contaminates through a sillcock when for one reason or another water pressure is lost to the water plumbing and sillcock.

SUMMARY OF THE INVENTION

The subject invention prevents the contamination of a water supply when the water from the water supply is used in the spraying of insecticides, chemicals, or the like.

The anti-backflow device is simple in design, easy to install, rugged in construction, and may be easily mounted in existing antifreeze sillcocks or installed in new plumbing systems.

The anti-backflow device works automatically in preventing the backflow of water mixed with insecticides and chemicals into the water system when the water pressure is cut off to the sillcock.

The anti-backflow device is adaptable to various sizes and shapes of sillcocks and in particular, antifreeze sillcocks used to prevent the freezing and breaking of water lines.

The anti-backflow device for mounting on a connecting rod inside a sillcock tube of a standard antifreeze sillcock includes a stationary tube disposed around the connecting rod and adapted for attaching thereto. An annular inlet port housing having inlet ports therethrough is disposed around the stationary tube. The outer circumference of the port housing has an annular seal mounted therearound for providing a seal between the housing and the inner circumference of the sillcock tube. A sliding tube is disposed around the stationary tube and includes an inlet port seal mounted at one end of the sliding tube. A coil spring is disposed around the stationary tube and is biased against the other end of the sliding tube. The spring urges the sliding tube and inlet port seal against the side of the inlet port housing thereby closing the inlet ports. The sliding tube and inlet port seal are urged away from the inlet port housing for opening the inlet ports when water under pressure is received in the sillcock tube and the water pressure overcomes the bias force of the spring.

The advantages and objects of the invention will become evident from the following detailed description when read in conjunction with the accompanying drawings which illustrate the preferred embodiments of the invention.

DETAILED DESCRIPTION OF THE DRAWINGS

Figure 1:
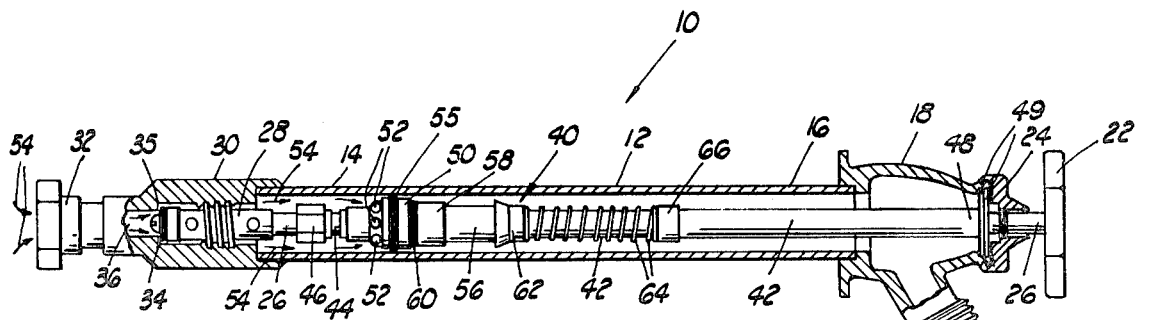
FIG. 1 is a side cut-away view of a standard antifreeze sillcock in a closed position with the anti-backflow device mounted thereon.

In FIG. 1, a cut-away view of a standard antifreeze sillcock is shown and designated by general reference numeral 10. The sillcock 10 includes a sillcock tube 12 having a first end portion 14 and a second end portion 16. The second end portion 16 of the tube 12 is attached to one end of the faucet 18. The faucet 18 includes a threaded water hose connection 20 and a valve operator 22. The valve operator 22 is attached to the faucet 18 by threaded nut 24. The valve operator 22 is also attached to one end of a connecting rod 26. The connecting rod 26 extends through the center of the faucet 18, through the center of the sillcock tube 12 and is attached to a water valve 28 inside a water valve housing 30. The valve housing 30 is communicably connected to a pipe connection 32 which is used to attach the sillcock 10 to a water supply pipe. The water supply pipe is not shown in the drawing.

The valve housing 30 is shown in a sectional view to illustrate the water valve 28 with a valve seal 34 in a closed position against a valve seat 35 in the housing 30. The water valve 28 is threadably connected inside the valve housing 30. By turning the valve operator 22 in a counterclockwise direction, the connecting rod 26 is turned thereby rotating the water valve 28 and opening the valve seal 34 away from the valve seat 35 allowing water to flow through a valve port 36 into the water valve housing 30 into the inside of the sillcock tube 12 and out the threaded water hose connection 20.

In the operation of spraying lawn plants, trees, crops, gardens, and various type of vegetation, a water supply system is connected to pressure tanks holding insecticides, chemicals, etc., which in turn are connected to spray equipment. Should there be a loss of water pressure for one reason or the other to the sillcock 10, the pressurized mixture of the insecticides, chemicals, or the like with the water will backflow through the sillcock 10 and into the water supply system thereby contaminating the water system. To prevent the backflow of contaminated water into the water supply system, the subject invention has been developed for attaching to the antifreeze sillcock 10 or any other water faucet used for supplying water from a water supply system. In FIG. 1, the antibackflow device is designated by general reference numeral 40.

The anti-backflow device 40 includes an elongated stationary tube 42 disposed around and adapted for attaching to the connecting rod 26. The stationary tube 42 includes a threaded first end portion 44 which is attached to a packing nut 46. The packing nut 46 secures the elongated stationary tube 42 to the connecting rod 26 and provides a seal to prevent leakage of water between the outer circumference of the connecting rod 26 and the inner circumference of the sillcock tube 12. A threaded second end portion 48 of the stationary tube 42 is connected to a pair of threaded lock washers 49, which are secured to the end of the faucet 18 by the locking nut 24. By securing the threaded second end portion 48 of the stationary tube 42 to the faucet 18, the stationary tube 42 is prevented from turning when the valve operator 22 rotates the connecting rod 26 to open the water valve 28 in the water valve housing 30.

An annular inlet port housing 50 is disposed around the first end portion 44 of the stationary tube 42 and attached thereto. The inlet port housing 50 includes a plurality of inlet ports 52 through the housing 50. The housing 50 further includes an annular seal 55 mounted around the outer circumference of the housing 50 for providing a water tight seal between the housing 50 and the inner circumference of the sillcock tube 12.

Figure 1A:
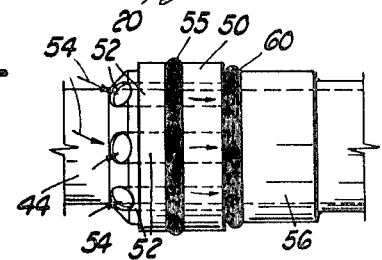
FIG. 1A is an enlarged view of the inlet port housing.

A sliding tube 56 is disposed around the stationary tube 42. The sliding tube 56 includes a first end portion 58 having an inlet port seal 60 mounted thereon. A second end portion 62 of the sliding tube 56 is disposed against one end of a coil spring 64. The other end of the coil spring 64 is held against a stop 66 attached to the stationary tube 42. The coil spring 64 is held in compression between the sliding tube 56 and the stop 66 with the coil spring 64 urging the sliding tube 56 to the left with the inlet port seal 60 contacting the side of the inlet port housing 50 and closing the flow of water 54 through the inlet ports 52. In FIG. 1 and FIG. 1A, the inlet port seal 60 is shown disposed against the housing 50 closing the flow of water 54 through the ports 52.

Figure 2:
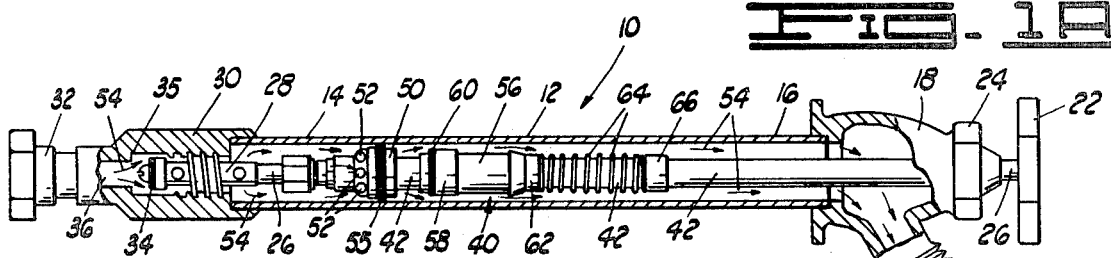
FIG. 2 is a side cut-away view of the sillcock with the antifreeze sillcock open allowing water to flow therethrough.

In FIG. 2, the valve operator 22 has been turned in a counterclockwise direction, thereby turning the connecting rod 26 which in turn rotates the water valve 28 in the water valve housing 30 and opening the water seal 34 from the valve seat 35 allowing water 54 to flow through the inlet port 36 into the sillcock tube 12 through the inlet ports 52 in the inlet port housing 50 and out the faucet 18. The water pressure of the water 54 when received in the sillcock tube 12 is sufficient to overcome the bias force of the coil spring 64 thereby moving the inlet port seal 60 to the right thereby opening the inlet ports 52 and allowing the water 54 to flow around the seal 60 past the sliding tube 56, through the sillcock tube 12, and out the faucet 18.

Figure 3:
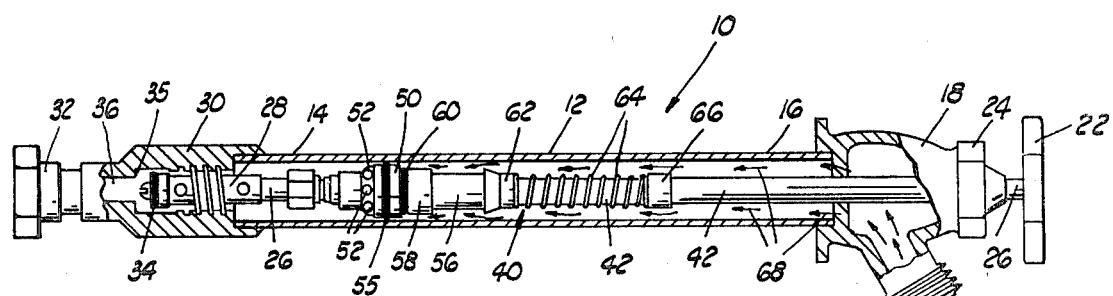
FIG. 3 is a side cut-away view of the antifreeze sillcock with the water pressure to the sillcock cut off and the anti-backflow device preventing the backflow of contaminated fluids from entering the water system.

In FIG. 3, the loss of water pressure in the sillcock 10 due to a water line break, the turning off of the water supply pump or any other reason for stopping the water supply is illustrated. When this happens, the water pressure is relieved against the inlet port seal 60 and the bias force of the coil spring 64 urges the inlet port seal 60 against the side of the inlet port housing 50 with the seal 60 closing the inlet ports 52 and preventing a backflow of contaminated water indicated by arrows 68 from flowing through the inlet port housing 50 through the water valve housing 30 and into the water pipe connection 32 thereby contaminating the water supply.

Changes may be made in the construction and arrangement of the parts or elements of the embodiment as disclosed herein without departing from the spirit or scope of the invention as defined in the following claims.

I claim:

1. An anti-backflow device for preventing fluids from flowing back into a water supply system comprising:
   (a) a connecting rod;
   (b) a stationary tube having a first end portion and a second end portion and disposed around said connecting rod;
   (c) a sillcock tube surrounding the connecting rod and defining a flow passage between an inlet port and an outlet port;
   (d) attaching means at said second end portion to maintain the stationary tube stationary relative to the sillcock tube while said connecting rod is allowed to rotate within the stationary tube relative to both the stationary tube and the sillcock tube;
   (e) a valve having an annular valve housing which includes a first annular seal means sealingly attaching said valve housing to the interior of the sillcock tube and the exterior of the stationary tube, said valve housing including a plurality of circumferentially spaced ports in proximity to said first seal means, and a second annular sealing means mounted on a valve head defined by a sliding tube and biased by a spring into engagement with the valve housing closing the ports, said spring additionally engaging a stop means on said first end portion of said stationary tube said stationary tube;
   (f) a rotary valve attached to said connecting rod to open and close said inlet port of said sillcock tube fluid passage, when said rotary valve is rotated to the open position fluid flows past the rotary valve through the plurality of said inlet ports and biases the valve head open to allow the fluid to communicate with said outlet port of the sillcock tube.

* * * * *